(12) United States Patent
Sajja et al.

(10) Patent No.: US 12,443,454 B2
(45) Date of Patent: Oct. 14, 2025

(54) OPTIMIZER AGNOSTIC EXPLANATION SYSTEM FOR LARGE SCALE SCHEDULES

(71) Applicant: INTERNATIONAL BUSINESS MACHINES CORPORATION, Armonk, NY (US)

(72) Inventors: Surya Shravan Kumar Sajja, Bangalore (IN); Kanthi Sarpatwar, Elmsford, NY (US); Lam Minh Nguyen, Ossining, NY (US); Yuan Yuan Jia, BeiJing (CN); Stephane Michel, Roquefort les Pins (FR); Roman Vaculin, Larchmont, NY (US)

(73) Assignee: International Business Machines Corporation, Armonk, NY (US)

( * ) Notice: Subject to any disclaimer, the term of this patent is extended or adjusted under 35 U.S.C. 154(b) by 996 days.

(21) Appl. No.: 17/534,385

(22) Filed: Nov. 23, 2021

(65) Prior Publication Data

US 2023/0161629 A1    May 25, 2023

(51) Int. Cl.
*G06F 9/50* (2006.01)
*G06N 7/01* (2023.01)

(52) U.S. Cl.
CPC .......... *G06F 9/5038* (2013.01); *G06F 9/5033* (2013.01); *G06F 9/5088* (2013.01); *G06N 7/01* (2023.01); *G06F 2209/504* (2013.01); *G06F 2209/508* (2013.01)

(58) Field of Classification Search
None
See application file for complete search history.

(56) References Cited

U.S. PATENT DOCUMENTS

| | | |
|---|---|---|
| 8,612,991 B2 | 12/2013 | Perticara |
| 11,507,430 B2 * | 11/2022 | Subramanian .......... G06F 9/505 |
| 2006/0167732 A1 | 7/2006 | Ricketts |
| 2012/0116835 A1 | 5/2012 | Pope et al. |
| 2012/0265570 A1 | 10/2012 | Mohamed et al. |

(Continued)

OTHER PUBLICATIONS

Cyras, K. et al., "Argumentation for Explainable Scheduling (Full Paper with Proofs)"; arXiv:1811.05437v2 [cs.AI] (2019); 9 pgs.

(Continued)

*Primary Examiner* — Eric C Wai
(74) *Attorney, Agent, or Firm* — CHIP LAW GROUP (57) ABSTRACT

A computer implemented method using an artificial intelligence (A.I.) module to explain large scale scheduling solutions includes receiving an original instance of a resource constrained scheduling problem. The instance includes a set of tasks and a variety of resource requirements and a variety of constraints. An optimizer process determines a schedule for the set of tasks while minimizing a makespan of the schedule. A minimal set of resource links is generated based on resource dependencies between tasks. The resource links are added to the original instance of scheduling problem, as precedence constraints. All the resource constraints are removed from the original instance of the resource constrained scheduling problem. A set of critical tasks is computed using a non-resource constrained critical path. Schedules are provided with an explanation of an optimized order of the set of tasks based on the use of the non-resource constrained critical path.

18 Claims, 7 Drawing Sheets

(56) References Cited

U.S. PATENT DOCUMENTS

2021/0240525 A1\* 8/2021 Liu .................. G06F 9/4843
2023/0094381 A1\* 3/2023 Meghani .............. G06N 3/092
  705/7.22

OTHER PUBLICATIONS

Cui, W., "Critical Sequences and Resource Links Optimization in Resource-Constrained Project Scheduling"; Asia-Pacific Journal of Operational Research (2018); vol. 35:5; 26 pgs.

Kim, K., "Generalized Resource-Constrained Critical Path Method to Improve Sustainability in Construction Project Scheduling" MDPI (2020); 19 pgs.

Franco-Duran, D. M., et al., "Phantom Float in Commercial Scheduling Software"; Automation in Construction (2019); vol. 109; pp. 291-299.

Agrawal, J. et al.,"Using Explainable Scheduling for the Mars 2020 Rover Mission"; arXiv:2011.08733v1 [cs.AI] (2020); 10 pgs.

Mell, P. et al., "Recommendations of the National Institute of Standards and Technology"; NIST Special Publication 800-145 (2011); 7 pgs.

Guéret et al. "Finding the Achilles Heel of the Web of Data: Using Network Analysis for Link-Recommendation", The Semantic Web—ISWC, 2010, pp. 289-304.

Nisar et al. "Enhanced Resource-Dependent Critical Path Method for Identifying Resource Dependencies in Variable Resource Constrained Project", Journal of Japan Society of Civil Engineers Ser F3 (Civil Engineering Informatics), Jan. 2013, 11 pages, vol. 69, Issue No. 2.

Nisar et al. "Resource-Dependent Critical Path Method for Identifying the Critical Path and the ^|^ldquo;Real Floats^| ^rdquo; in Resource-Constrained Project Scheduling", Journal of Japan Society of Civil Engineers Ser F4 (Construction and Management), Jan. 2013, 11 pages, vol. 69, Issue No. 4.

\* cited by examiner

OPTIMIZER AGNOSTIC EXPLANATION SYSTEM FOR LARGE SCALE SCHEDULES

BACKGROUND

Technical Field

The present disclosure generally relates to project management systems, and more particularly, to an optimizer for large scale schedules.

Description of the Related Art

Task/job scheduling is a ubiquitous problem appearing in areas of computing and production/process management. Mathematical optimization methods and solvers dedicated to solve such problems are well established. However, they are usually proprietary and their inner-workings are hidden to avoid potential infringement by competitors. Outputs of such black-box schedulers can be made more interpretable by identifying a set of critical tasks/sequences within the output schedule. Critical tasks illustrate the flexibility associated with schedules and in many scenarios, they can be used for resource re-allocation. State of the art approaches for identifying resource constrained critical tasks are not scalable and their run times become impractical (hours) for large scale projects with thousands of tasks or more.

Decision optimization models that cannot be well-interpreted are difficult to be trusted. A business user of such decision optimization models is always interested in their explanations to identify errors/biases in their formulation and how their business process can be improved. Though it is possible to explain the optimization model through its specification and optimality (or infeasibility) certificates, these formulations are traditionally hidden and use explicit engineering and communication efforts to empower users with better explanations. Other efforts to build inherently interpretable decision optimization models are based on building interpretable tree based surrogate models for black-box decision optimization engines.

SUMMARY

According to an embodiment of the present disclosure, a computer implemented method to explain large scale scheduling solutions on large scale project scheduling instances is provided. The method includes receiving, by an artificial intelligence (A.I.) module, an original instance of a resource constrained scheduling problem. The instance includes a set of tasks, resource requirements, and constraints. An optimizer engine determines a schedule for the set of tasks based on (i) the resource requirements and on (ii) the constraints, while minimizing a makespan of the schedule. A minimal set of resource links is generated. The resource links are based on resource dependencies between tasks in the set of tasks. The resource links are added to the original instance of the resource constrained scheduling problem, as precedence constraints. All the resource constraints are removed from the original instance of the resource constrained scheduling problem. A constraint propagation method is used to compute a set of critical tasks in the schedule of tasks using a non-resource constrained critical path. One or more schedules are provided with an explanation of an optimized order of the set of tasks based on the use of the non-resource constrained critical path.

In an embodiment, the method includes, in the case of a single uniform resource type, constructing a set of time slots of start and end times for each of the tasks. A left dummy task and a right dummy task are added respectively, to the left of and to the right of, each time slot in the set of time slots. A transportation problem instance is constructed. The left dummy task, ending before a current time slot, represents suppliers as the tasks. The right dummy task, starting after the current time slot, represents demands as the tasks. The transportation problem instance is solved to obtain sets of pairs of tasks. Each pair of tasks represents: suppliers and demands, and a non-zero transfer of a resource from a supplier task to a demand task. The resource link is added for each pair of tasks, to a precedence graph. Post-processing of the dummy tasks includes: for each dummy task, adding the resource links between incoming neighbor tasks and outgoing neighbor tasks in the precedence graph. All the dummy tasks are deleted.

The addition of dummy tasks into the process reduces computational resources needed in solving the transportation problem by ignoring historical tasks that are far off from nearby tasks. The link between far off tasks are dropped as soon as the dummy tasks are deleted from consideration in the process.

According to an embodiment of the present disclosure, a computer program product to explain large scale scheduling solutions on large scale project scheduling instances is provided. The computer program product includes one or more computer readable storage media, and program instructions collectively stored on the one or more computer readable storage media. The program instructions include receiving, by an artificial intelligence (A.I.) module, an original instance of a resource constrained scheduling problem. The instance includes a set of tasks, resource requirements, and constraints. An optimizer engine determines a schedule for the set of tasks based on (i) the resource requirements and on (ii) the constraints, while minimizing a makespan of the schedule. A minimal set of resource links is generated. The resource links are based on resource dependencies between tasks in the set of tasks. The resource links are added to the original instance of the resource constrained scheduling problem, as precedence constraints. All the resource constraints are removed from the original instance of the resource constrained scheduling problem. A constraint propagation method is used to compute a set of critical tasks in the schedule of tasks using a non-resource constrained critical path. One or more schedules are provided with an explanation of an optimized order of the set of tasks based on the use of the non-resource constrained critical path.

In one embodiment, the case of a multiple uniform resource type is addressed. The embodiments include constructing a set of time slots of start and end times for each of the tasks. A left dummy task and a right dummy task respectively are added to the left of and to the right of, each time slot in the set of time slots. A multi-resource transportation problem instance is constructed. The left dummy task, ending before a current time slot, represents suppliers as the tasks. The right dummy task, starting after the current time slot, represents demands as the tasks. The multi-resource transportation instance is solved to obtain a set of triplets of tasks and resources. Each triplet represents: a supplier, a demand, and a resource, and a non-zero transfer of the respective resource from a supplier task to a demand task. The resource link, annotated with a corresponding resource, is added for each triplet, to a precedence graph. Post-processing of the dummy tasks, includes: for each dummy task, adding the resource links between incoming neighbor tasks and out-going neighbor tasks in the precedence graph; and deleting all the dummy tasks.

As will be appreciated, prior approaches do not consider multiple resource types. Handling resources one-by-one blows up the runtime factor by the number of resources (which could be in hundreds). The embodiment of the subject disclosure deals with multiple resources simultaneously during solving of the transportation problem. This is possible because the instance sizes have been through addition of the dummy tasks.

According to an embodiment of the present disclosure, a computer device to explain large scale scheduling solutions on large scale project scheduling instances is disclosed. The computer server includes: a network connection; one or more computer readable storage media. An artificial intelligence (A.I.) module is stored in the computer readable storage media. A processor is coupled to the network connection and coupled to the one or more computer readable storage media. A computer program product includes program instructions collectively stored on the one or more computer readable storage media. The program instructions include receiving, by the A.I. module, an original instance of a resource constrained scheduling problem. The instance includes a set of tasks, resource requirements, and constraints. An optimizer engine determines a schedule for the set of tasks based on (i) the resource requirements and on (ii) the constraints, while minimizing a makespan of the schedule. A minimal set of resource links is generated. The resource links are based on resource dependencies between tasks in the set of tasks. The resource links are added to the original instance of the resource constrained scheduling problem, as precedence constraints. All the resource constraints are removed from the original instance of the resource constrained scheduling problem. A constraint propagation method is used to compute a set of critical tasks in the schedule of tasks using a non-resource constrained critical path. One or more schedules are provided with an explanation of an optimized order of the set of tasks based on the use of the non-resource constrained critical path.

In addition, it should be appreciated that the embodiments described above provide an advantage over automated scheduling systems and processes. By using a resource constrained critical path in combination with other features, large scale project scheduling solutions are remain explainable as the project size scales. Multiple resource type constraints can be added to the problem and solved by the proposed process approaches. Thus, even user defined constraints can be added to other resource and capacity type restraints. Other elements such as interruptible job tasks are accounted for and provided in the end schedule solutions.

The techniques described herein may be implemented in a number of ways. Example implementations are provided below with reference to the following figures.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION

Overview

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

The present disclosure generally relates to artificial intelligence used in generating project schedules optimized for completion within a makespan. A makespan is the duration associated with the completion of a project. In one aspect of the subject technology, the embodiments may be configured for post-hoc or post-optimization explainability. The embodiments generate optimization solvers for a deterministic version of a resource constrained project scheduling problem (RCPSP), which is a generalization of the production-specific job-shop, flow-shop and open-shop scheduling problems. Solution for an RCPSP is usually a schedule of jobs which satisfies certain user defined constraints and this solution is the target of explanation provided by the subject technology. Generally speaking, the target is explained in terms of some key features/drivers that are causally responsible for generation of a target solution by the solver. These features/drivers can be decision variables or problem specific parameters. Also, these features/drivers can be used to explain a particular solution of the solver or the general behavior of the solver.

In the disclosure that follows, the A.I. provided explains the schedule generated by a solver in terms of the decision variables used for modeling the scheduling problem. For scheduling problems, each job/task is modeled using a decision variable with a duration, start time, and end time. Such decision variables are called interval variables and upon execution of the model, the values assigned to these variables represent the solution to the scheduling problem. The conventional solution includes start and end times of all tasks and the resources allocated to these tasks. However, the conventional solution does not provide flexibility associated with each task's scheduling. To be more precise, a conventional scheduling solution does not provide slack (or float) associated with each task. Tasks in the solution with zero float or relatively small values of float become critical in the execution of the project. A delay in a such critical tasks may lead to overall delay in the project. Aspects of the subject technology identify critical tasks/sequences for project managers. The resultant optimized schedule is explained in terms of the slack associated with each decision variable used to model tasks of the target schedule. Critical tasks illustrate the flexibility associated with schedules, and the activities to which more attention should be paid during the execution process and which resource requirements should be satisfied with higher priority when unexpected events happen.

Traditionally, the approach to identify critical tasks in a project with interdependent tasks is known as critical path method (CPM). It has been used to estimate the minimum project duration and determine the amount of scheduling flexibility on the logical network paths within the schedule model. Traditional CPM schedule is not realistic, because it assumes unlimited resources, therefore, considerable research efforts have been made to generalize CPM, and a multitude of new methods have been published under the umbrella term resource constrained critical path method (RCPM).

Existing RCPM methods are mostly intertwined with a specific approach to obtain a resource constrained schedule (using a heuristic) for a project. Hence these methods cannot be used in a standalone fashion for existing schedules. Since these methods are specific to a resource constrained scheduling algorithm, addition of extra business constraints is usually not feasible.

It should be understood that the amount of data to process for scheduling large scale projects is beyond the reasonable capability of an individual or a team of individuals. The number of variables involved with optimizing scheduling solutions for enterprise or other large scale projects is not practically possible for a given accuracy and/or timeframe by human capacity. Accordingly, a project would proceed without trying to optimize the schedule. Aspects of the subject technology provide a technical benefit of reducing the time requirements and computational loads of an appropriately configured computing platform for determining solutions of large scale task schedules, which improve on the technology of automated task scheduling. Moreover, some embodiments include unconventional features in the process of solving for large scale task scheduling by including placeholder values in the computation of critical paths, which eliminates some data that is not critical to optimized solutions, thereby simplifying the computational workload.

As will be appreciated, embodiments of the subject technology may be agnostic to scheduling algorithms, and can work with any existing schedule. Unlike existing RCPM methods, the subject approach does not require that the existing schedule be optimal. The schedule can also be an intermediate output scheduling algorithm rather than the final outcome. For example, a resource constrained critical sequence extraction method is disclosed that is optimizer agnostic. Given a schedule with resource allocation, the subject technology extends traditional CPM while including resource dependencies between various tasks of the schedule. The extraction of resource dependencies may be converted into a mixed integer program, which produces an optimal number of resource dependency links between different tasks of the project. This optimal set of resource links along with technological dependency (precedence) links are used to extract a resource constrained critical path. Some of the features of the optimizer system and modeling process include:

Handling multiple resource types, tools, and zones (which are beneficial to complex projects such as aircraft maintenance projects).

Addressing time varying resource availability for multiple types of resources in a scheduled project.

Accounting for interruptibility of tasks. Scheduling with interruptibility is important for many industrial and computational projects. Some aspects of the modeling and optimization process address the effect of interruptibility on criticality of a task.

Performance in enterprise scale projects with thousands of tasks. Large scale projects create new challenges in terms of computational performance and visualization of the large critical task set.

State of the art RCPM approaches take hours to extract critical tasks for project beyond the size of thousand tasks. This is highly undesirable for an explanation. Embodiments of the subject technology improve the computational performance by at least a factor of 16. This allows generation of critical tasks on schedules with thousands of tasks and tens of resources within minutes.

Example Architecture

Figure 1:
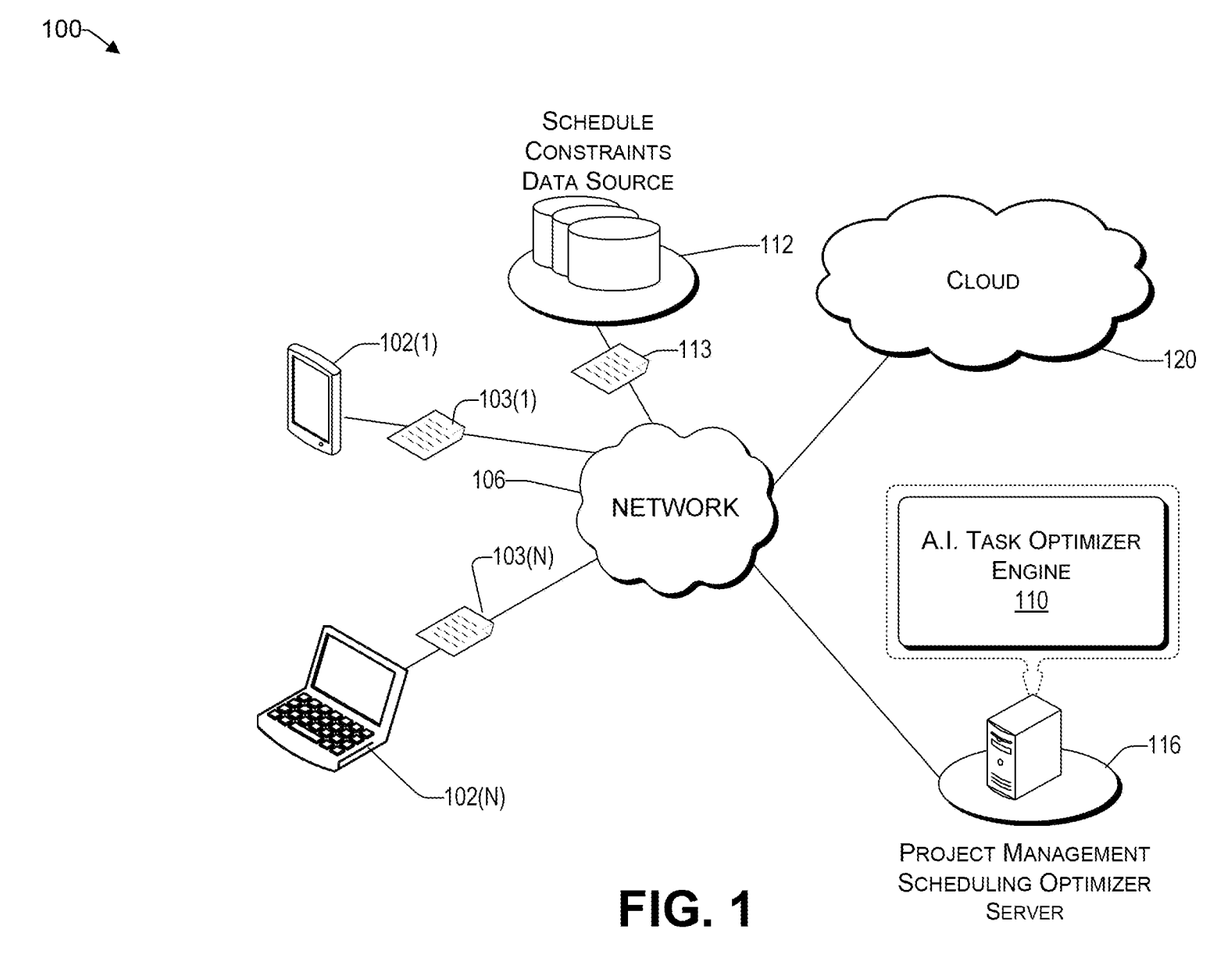
FIG. 1 is a block diagram of an architecture for determining optimal schedules for large scale projects according to an embodiment.

FIG. 1 illustrates an example architecture 100 for an A.I based explanator and scheduling solver of large scale projects. Architecture 100 includes a network 106 that allows various computing devices 102(1) to 102(N) to communicate with each other, as well as other elements that are connected to the network 106, such as a schedule constraints data source 112, a project management scheduling optimizer server 116, and the cloud 120.

The network 106 may be, without limitation, a local area network ("LAN"), a virtual private network ("VPN"), a cellular network, the Internet, or a combination thereof. For example, the network 106 may include a mobile network that is communicatively coupled to a private network, sometimes referred to as an intranet that provides various ancillary services, such as communication with various application stores, libraries, and the Internet. The network 106 allows an A.I. task optimizer engine 110 (sometimes referred to simply as the "solver engine 110"), which is a software program running on the project management scheduling optimizer server 116, to communicate with the schedule constraints data source 112, computing devices 102(1) to 102(N), and the cloud 120, to provide data processing of task scheduling. The schedule constraints data source 112 may provide constraints on a project management schedule that are considered by an A.I. model in the project management scheduling optimizer server 116 when solving for and explaining a scheduling solution or generating an optimized schedule of tasks. In one embodiment, the data processing is performed at least in part on the cloud 120. A set of tasks 113 accompanied by constraints for the tasks may be provided to the project management scheduling optimizer server 116. The constraints may be resource constraints, a capacity precedence constraint, or other business user defined constraints that should be considered when solving for a schedule. The resource constraints may be single resource type or multiple resource type. The resource constraints may include time varying resource availability.

For purposes of later discussion, several user devices appear in the drawing, to represent some examples of the computing devices that may be the source of data being analyzed depending on the task chosen. Aspects of the symbolic sequence data (e.g., 103(1) and 103(N)) may be communicated over the network 106 with the task optimizer engine 110 of the project management scheduling optimizer server 116. Today, user devices typically take the form of portable handsets, smart-phones, tablet computers, personal digital assistants (PDAs), and smart watches, although they may be implemented in other form factors, including consumer, and business electronic devices. For example, a computing device (e.g., 102(N)) may send a request 103(N) to the project scheduling solver engine 110 to generate an optimized schedule for a project whose tasks are stored in the computing device 102(N).

While the schedule constraints data source 112 and the task optimizer engine 110 are illustrated by way of example to be on different platforms, it will be understood that in various embodiments, the schedule constraints data source 112 and the project management scheduling optimizer server 116 may be combined. In other embodiments, these computing platforms may be implemented by virtual computing devices in the form of virtual machines or software containers that are hosted in a cloud 120, thereby providing an elastic architecture for processing and storage.

Example Methodology

Some embodiments use graph decomposition techniques for the critical task set to generate smaller critical subsets improve their cognitive tractability. The resource constrained project scheduling problem (RCPSP) problem is a generalization of the production-specific job-shop, flow-shop and open-shop scheduling problems. Given: a set of activities (tasks), a set of resources with given capacities, a network of precedence constraints between the activities for each activity and each resource, the amount of the resource required by the activity over its execution, for each activity, users can also define additional business constraints, the goal of the RCPSP of the subject technology is to find a schedule meeting all the constraints whose makespan (the time at which all activities are finished) is minimal.

The following are some definitions for some of the terms used in the embodiments disclosed.

Definitions

Tasks: The tasks (sometimes referred to as jobs, operations or activities), are performed in a manner such that overall project goals are satisfied. Each task is described with measurable parameters for example, duration, cost, and resource requirements. Tasks constituting the project are identified by a set $V=\{T_0, T_1, \ldots, T_{J+1}\}$. Tasks $T_0$ and $T_{J+1}$ are dummy nodes representing the start and end nodes of the project. The set of non-dummy tasks is identified by $T=\{T_1, \ldots, T_J\}$. Interruptibility is a property associated with each task in some embodiments. If a task is interruptible, then the scheduler is allowed to interrupt the processing of a task (preempt) at the end of a shift (time-interval) and start the task again in the next shift. The next shift is not necessarily immediately after the previous shift (for example, a company may end one shift and shutdown until a next shift starts hours later). The amount of work already done on the interrupted task is not lost and when an interrupted task is resumed. The task only needs the resource for its remaining processing time.

Durations: Let p(T) denote the fixed duration of activity $T \in T$ and s(T) (resp. e(T)) denote the decision variable representing the start (resp. end) time of task T and special values $p(T0)=p(TJ+1)=0$.

Precedence relationships: Precedence relations refer to technological reasons and resource constraints that require some tasks to be finished before others can start. Precedence relations are represented through a directed acyclic graph G=(V, E) where each node in V represents a task and each arc $(T_i, T_j) \in E$ represents a precedence constraint between $T_i$ and $T_j$.

Resources: Scheduling involves two different kinds of resources: renewable and nonrenewable. Renewable resources are available for each period without being depleted. Examples of renewable resources include labor, tools and equipment. Nonrenewable resources are limited for the entire project; they are depleted as they are used. Some of the embodiments focus on renewable resources for scheduling optimization. Large scale scheduling projects in aviation industry have different categories of resources like crafts, tools and crew members. Within each category there can be multiple types of resources. Hence, industrial scheduling projects have resources with an inherent hierarchy associated with them that can be used. However, for simplicity of exposition, the underlying processes assume that there are K types of renewable resources given by the set: $R=\{R_1, R_2, \ldots, R_K\}$.

Availability: For each resource $R_K \in R$ having a maximal available capacity $B(R_k)$ over the entire scheduling horizon. Some embodiments of the scheduling solver address the scenario where $B(R_k)$ may vary in a piece-wise constant manner over different time intervals of the scheduling horizon.

Demands: Each task requires $T_j \in T$ requires a non-negative quantity $b(T_j, R_k)$ of resource $R_k$.

Constraints: Business users can present extra constraints in the form of hierarchies of tasks, where parent tasks start, or end based on their children tasks. Other examples of business constraints are (a) zone constraints in aviation maintenance, where some tasks are associated with a zone, implying that those tasks should be carried out in that physical location represented by the zone. Such zones can limit the number of resources (tools/crew) that can be allocated. (b) Shift constraints, are in the form of:
calendars/work periods for shifts,
breaks for shifts
craft/crew capacity by shift.

As will be appreciated, aspects of the schedule solver may integrate user defined constraints without any need for customization of the underlying process.

Objective: The goal of the RCPSP problem is to compute a feasible schedule S that maps each task $T \in V$ to a start time s(T) and end time e(T) such that all the constraints (precedence, resource, and business constraints) are satisfied and the makespan, $L=\max T(e(T)) - \min T(s(T))$ is minimized. The search for such an optimal solution in this problem using a commercial solver tool can potentiality take a long time for a RCPSP since the problem belongs to the class of NP-hard problems. Therefore, using even the most powerful conventional solvers optimality is not necessarily guaranteed in polynomial time.

Critical Path

A "critical path" is a set of tasks that if delayed (slightly) leads to an immediate increase in the makespan objective. In the embodiments, a critical path is determined by identifying the longest stretch of dependent tasks and measuring the time required to complete them from start to finish. The primary purpose of the schedule is to define the critical and near-critical paths based on technological requirements alone. Critical tasks demand management attention and are prioritized during project execution and resource allocation to maintain robust schedule times in the presence of uncertain disturbances.

To determine a critical path, a network diagram may be constructed that can show the precedence relationships among the project tasks. The start and finish times for each task may be calculated using forward and backward passes. Forward pass calculations start at the beginning of the project and move to the end of the project, to determine the early start times (ES) and late start times (LS) of the tasks. Backward pass calculations start at the end of the project and move back to the beginning the project, to determine the early finish times (EF) and late finish times (LF) of the tasks. By definition, critical tasks cannot be delayed without changing the total turnaround time of the schedule, hence the slack (float) associated with critical tasks would be zero. Total float (TF) for each task can be defined more formally as LF−EF or LS−ES. Once, these times are calculated for all the tasks in the project, critical tasks can be extracted by choosing all the tasks with zero total float. However, a traditional CPM approach is limited in its applicability because the approach fails to account for resource limitations. Traditional CPM will result in erroneous identification of critical tasks and will lead to rejection of the schedule by the users. Embodiments that solve the resource constrained critical path for an RCPSP are disclosed below.

Figure 2:
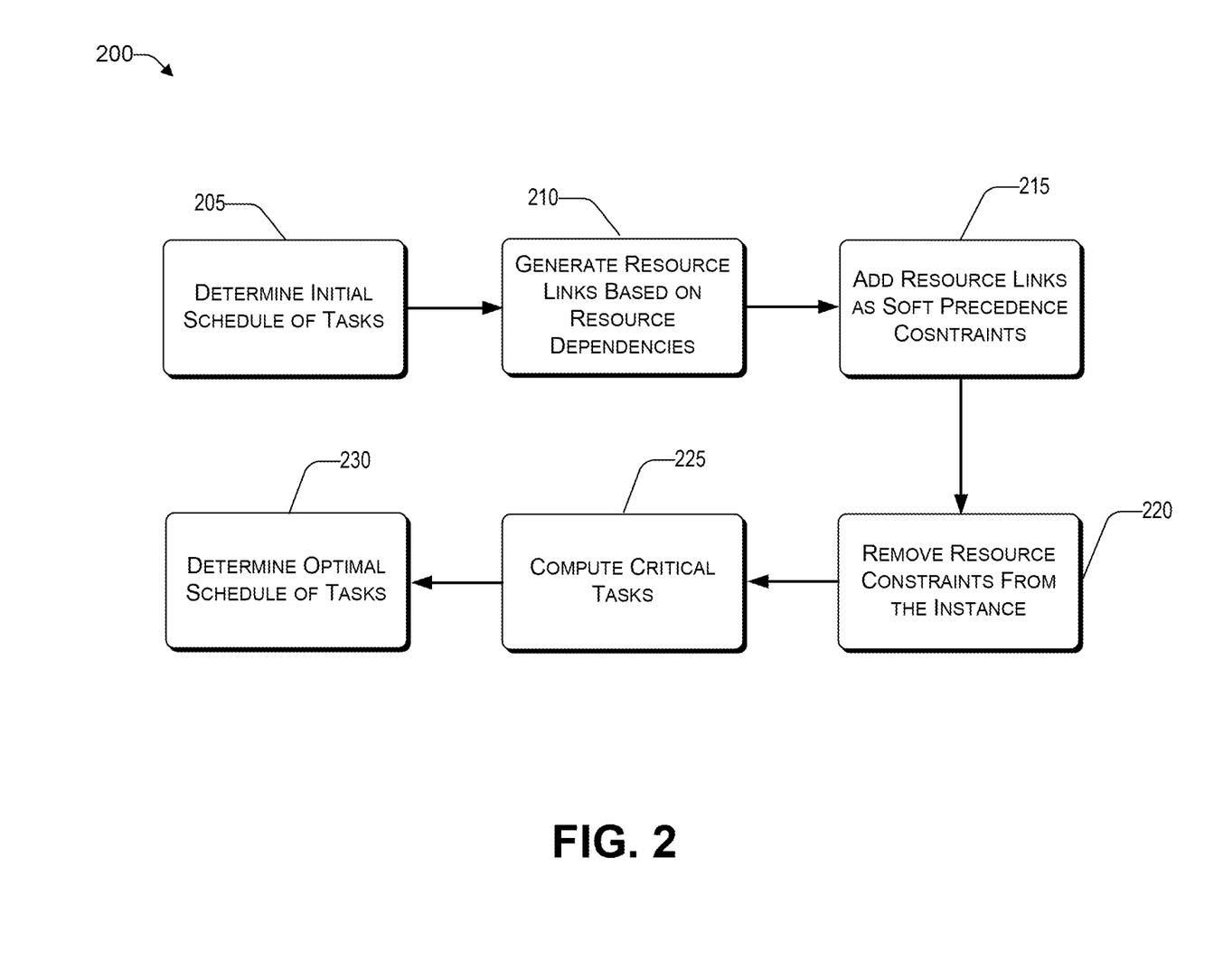
FIG. 2 is a flow chart of a method of a computing resource constrained critical path for an optimized schedule according to some embodiments.

Referring now to FIG. 2, a method 200 for determining an optimal schedule for a large scale project is shown according to an illustrative embodiment. At a high-level, a resource constrained critical path method according to embodiments can be described by the algorithm below.

A heuristic process for computing resource constrained critical path includes:
Input: An instance of resource constrained project scheduling problem: I:=(V, R, G=
(V,E), p: V→W, b: V×R→W).
Result: Set of critical tasks C⊆V In block 205, the solver engine 110 uses a mathematical programming engine to compute a feasible schedule (optimally if possible) S: V←[L]×[L], where L is the makespan of the schedule, for example, the end time of the last task.

In block 210, the solver engine 110 generates a minimal set of resource-links that capture the various resource dependencies between tasks. a "minimal set" may mean that the number of resource links have been minimized through optimization. "Resource links" may be considered auxiliary links in the graph of tasks that capture the transfer of resources between different tasks.

In block 215, the solver engine 110 adds resource links as soft precedence constraints.

In block 220, the solver engine 110 removes the resource constraints from the original schedule instance computed in block 205.

In block 225, the solver engine 110 computes the critical tasks using a non-resource constrained critical task extraction method. The result is a non-resource constrained critical path.

In some embodiments, the critical tasks determined in block 225 may be used to determine an optimal schedule of tasks for a project (block 230).

Although the term "resource constrained critical path" is used, generalization of CPM to the resource constrained scenario, does not always generate a single path. In such cases the set of all critical tasks forms a directed acyclic graph (DAG).

Example Uniform Single Resource Case

Figure 3:
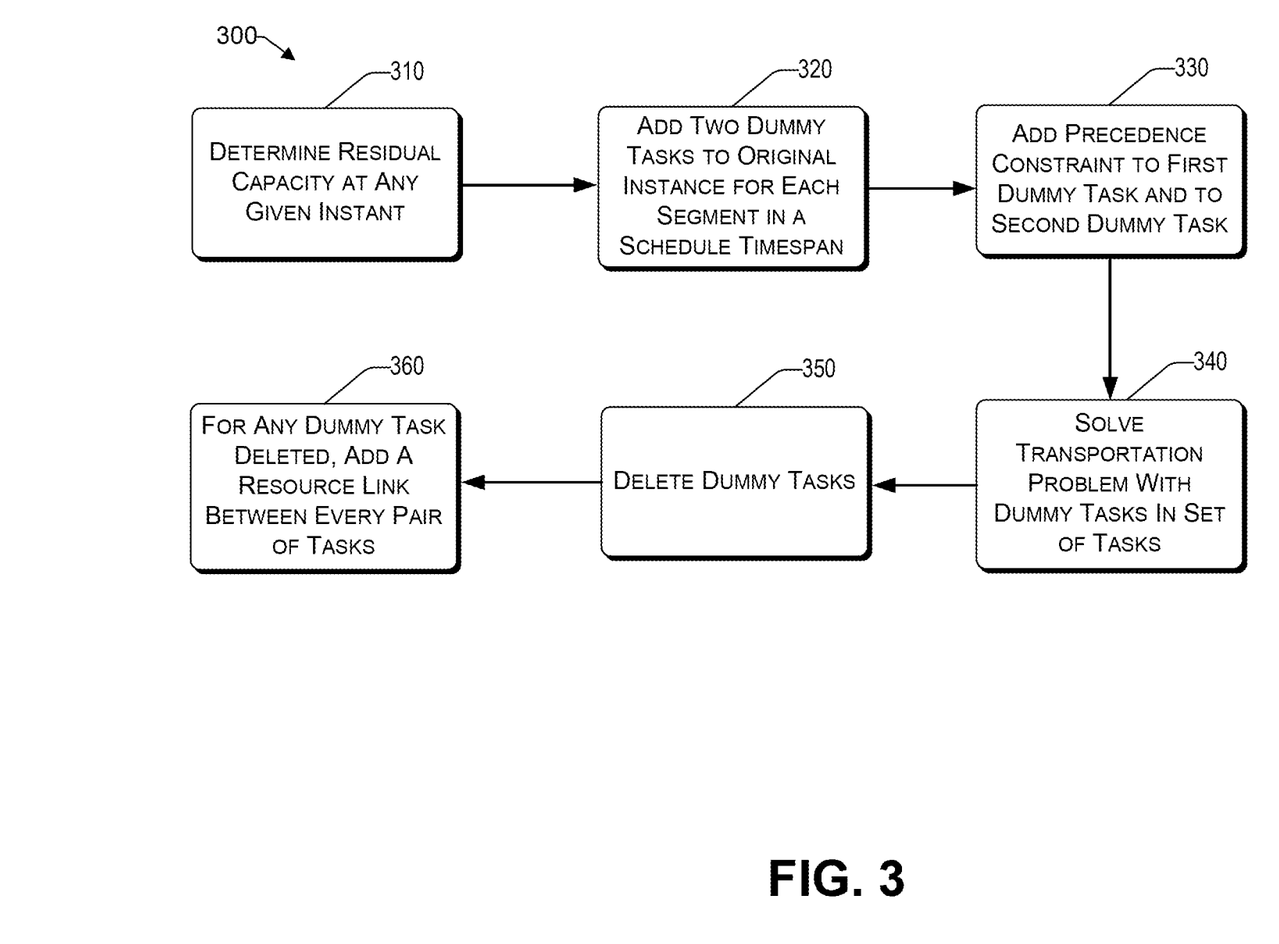
FIG. 3 is a flow chart of a method for an A.I. based explanation of a schedule of tasks for a uniform single resource constraint according to an embodiment.

Referring now to FIG. 3, a method 300 for an A.I. based explanation of a schedule of tasks for a uniform single resource constraint is shown according to an illustrative embodiment. A "uniform single resource" means one type of resource and its availability remains constant throughout the schedule. In the method 300, the number of sources in each of transportation instance can be quite large since we include all the earlier tasks $A_t^{ear}$ at time instant t. In block 310, the value of the residual capacity, may be determined. For a single uniform resource case. Let R be the resource and C denote its uniform capacity. At any given instant t, define $r(t)=C-\Sigma_{T\in S_t}b(T, R)$, where St is the set of tasks T such that $s(T)\leq t\leq s(T)+p(T)$. Accordingly, the time instant t belongs to the scheduled duration of task T. The residual capacity forms a step function and therefore naturally partitions the time horizon into several segments. Let the segments be denoted by $W_1, W_2, \ldots W_k$. Note that each of these segments have a uniform residual capacity and hence their boundaries denote a transfer of resources between tasks. In block 320, for each $W_j$, two dummy tasks $D_j^l$ and $D_j^r$ are added to the original instance with 0 duration and resource requirement as the residual capacity in the time interval Wj. For purposes of solving a transportation problem, $D_j^l$ represents the task to the left of a task at an instant t. $D_j^r$ represents a task to the right of the task. In block 330, a precedence constraint is added from $D_j^l$ to $D_j^r$. The solution start time of $D_j^l$ is set to the beginning of $W_i$ and start time of $D_j^r$ is the end of $W_i$. Using these factors, a transportation problem may be set up and solved in block 340.

Note that $c_{ij}$ is 0 if one of the tasks involved is a dummy, otherwise it is 1. A "dummy task" is a placeholder unit defined as a task for the transportation problem but has no actual task description or constraint. This captures the intuition that dummy tasks represent available resource and are therefore "free" suppliers in the transportation problem. The key intuition behind adding these dummy tasks is to remove the dependency on the non-neighboring prior tasks ($A_t^{ear}$) for resources. The feasibility of the above transportation is ensured by the dummy tasks since the combined demand and supply is balanced. An advantage in using the dummy tasks is that earlier tasks $A_t^{ear}$ may be eliminated from the solution computation which can be quite large. In block 340, the transportation problem may be solved with the dummy tasks included.

In block 350, the dummy tasks may be removed. Since dummy tasks are added as part of the subject technology's process and are not a part of the original instance, the dummy tasks are dealt with. One natural approach here is to delete them and any resource links incident on them. This deletion ensures that only direct resource links, for example, links between adjacent tasks, are considered. In other embodiments for certain scenarios, indirect links (from early tasks to current tasks) may be preserved. These indirect links may be provided for example, by adding a resource link between every pair of jobs Ti and Tj, for any dummy task deleted (D), such that there are links (resource or precedence) from Ti to D and D to Tj, which represents, for example, a transitive closure on the tasks.

Example Multiple Uniform Resources

Figure 4:
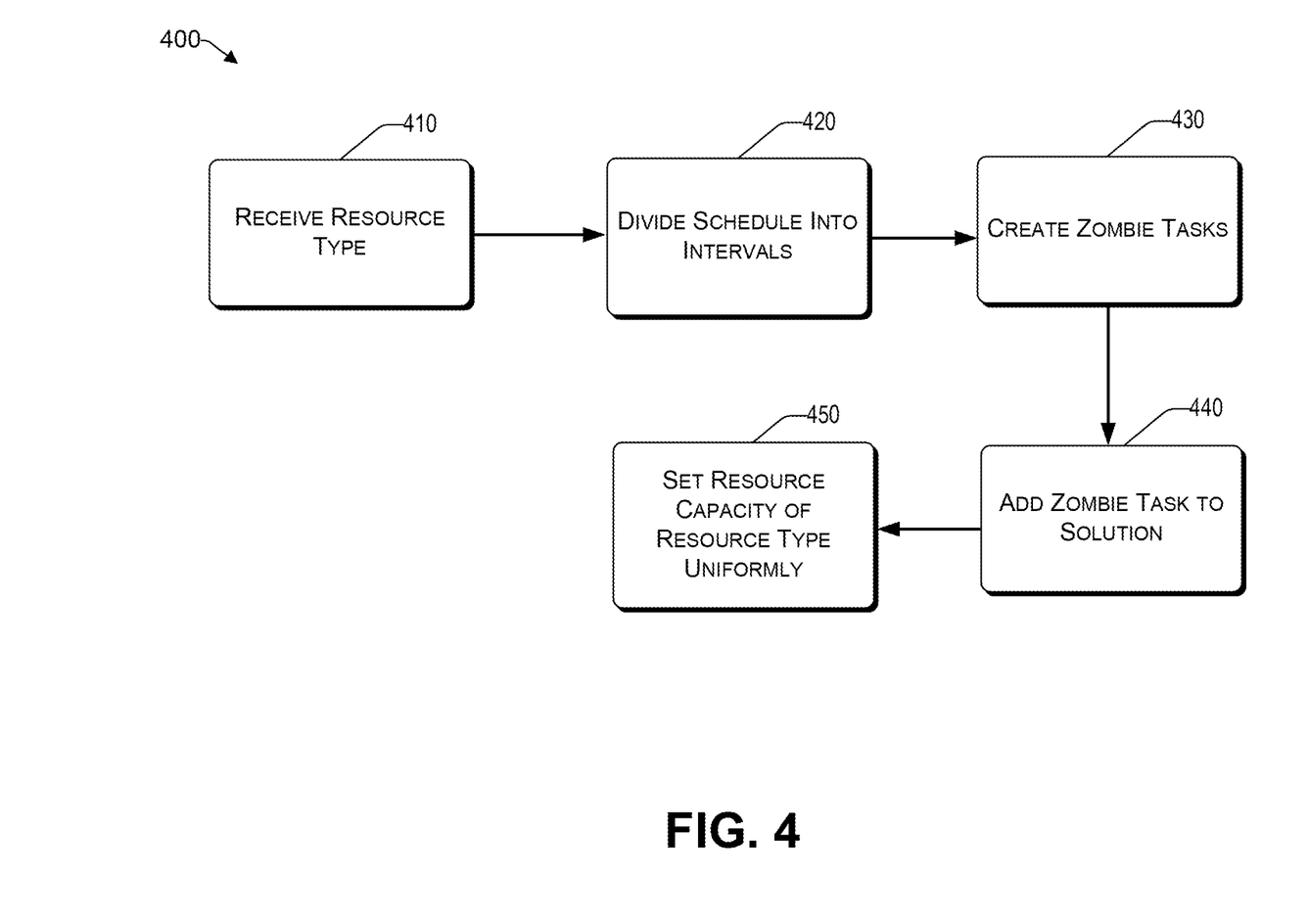
FIG. 4 is a flow chart of a method for an A.I. based explanation of a schedule of tasks for a multiple resource constraint according to an embodiment.

Referring to FIG. 4, the case of multiple resources is addressed when solving for a large scale schedule of tasks. One approach would be to generate resource links independently for each resource. Unfortunately, this approach is not scalable as the number of resources in real applications could in the hundreds. For example, in a large scale aircraft maintenance application a variety of resources such as craft requirements, specific types of crew, zoning requirements etc., and the number of constraints could easily run into 100s.

To improve computational efficiency, the task optimizer engine 110 generates resource links for all the resources in a single shot. Assuming there are K resource types: R={R1, R2, . . . , RK}, the resource availability B(Rk) may be assumed to be uniform during the entire project. In an illustrative embodiment, time-varying resource capacities may be addressed by using the notion of "zombie" tasks. A "zombie" task is a placeholder value representing a task that does not require an actual act. In the method 400, the variations in resource availability are deterministic and known in advance. In block 410 a resource type Ri is received, and its availability B(Ri) varies over time during the schedule. To account for the varying availability of the resource, in block 420, the schedule is divided into intervals. In block 430, zombie tasks are created that each include a duration, a resource requirement, and a time window constraint. In block 440, the zombie tasks may be added to the solution obtained for the start time. In block 450, the resource capacity is set uniformly for the resource type.

Example Handling Shifts and Interruptibility

An additional dimension to the resource link generation of the subject technology is added by special tasks known as "interruptible" tasks. These are tasks that can be interrupted and restarted across different shifts. For example, consider a scheduling instance across two days with 8 hour shifts (for example, 9 AM to 5 PM). Suppose A is a task with a duration requirement of 8 hours and is released at 12 PM on the first day. If A is a regular task, the task must be scheduled only on the second day but if it is interruptible, the task may be broken up into two 4 hours subtasks by scheduling the first subtask at noon on the first day and the second subtask at the beginning of the next shift (9 AM on the following day).

To handle interruptible tasks, the solution obtained in block 205 of FIG. 2 may be transformed. The time horizon may be transformed by deleting the time-windows between the shifts. For each task that has been spread across multiple shifts, the individual pieces of tasks may be combined as a single job spread uninterrupted on the modified time horizon. The single task (previously comprising different individual tasks) may be designated as a regular un-interruptible task for scheduling solutions. In the case where different resources have different shifts, a modified time-horizon may be created for each resource and resource links may be generated independently.

Example Implementation

To model and solve the scalable resource link optimization problem the method 200 of FIG. 2 may be solved using constraint programming with an optimizer. The original scheduling problem may be modeled without any resource constraints. Other business constraints (for example, task hierarchy with precedence constraints, time window constraints, shifts, etc.) may be added as input. All tasks may be assumed to be interruptible. Accordingly, any non-working time (calendars) associated to a task interrupts the task. Resource links may be generated by the scalable resource link optimization method along with the "zombie" tasks.

For the target of explanation, the solver engine 100 generates a feasible schedule as a solution. The project turnaround time TAT(I) from this solution may be added as a new temporal constraint on all tasks of the project; a new latest end time for all tasks of $I_{SIMPLE}$. Now, constraint propagation may be used to communicate this new constraint on all tasks of $I_{SIMPLE}$ to all the other constraints on these tasks. Constraint propagation results in domain reduction of all the decision variables involved in modeling $I_{SIMPLE}$ and allows extraction of the early start times (ES), late start times (LS), early finish times (EF) and late finish times (LF) of all tasks. These time values may be used to calculate the total float (TF) and extract critical tasks with TF=0.

Example Computer Platform

Figure 5:
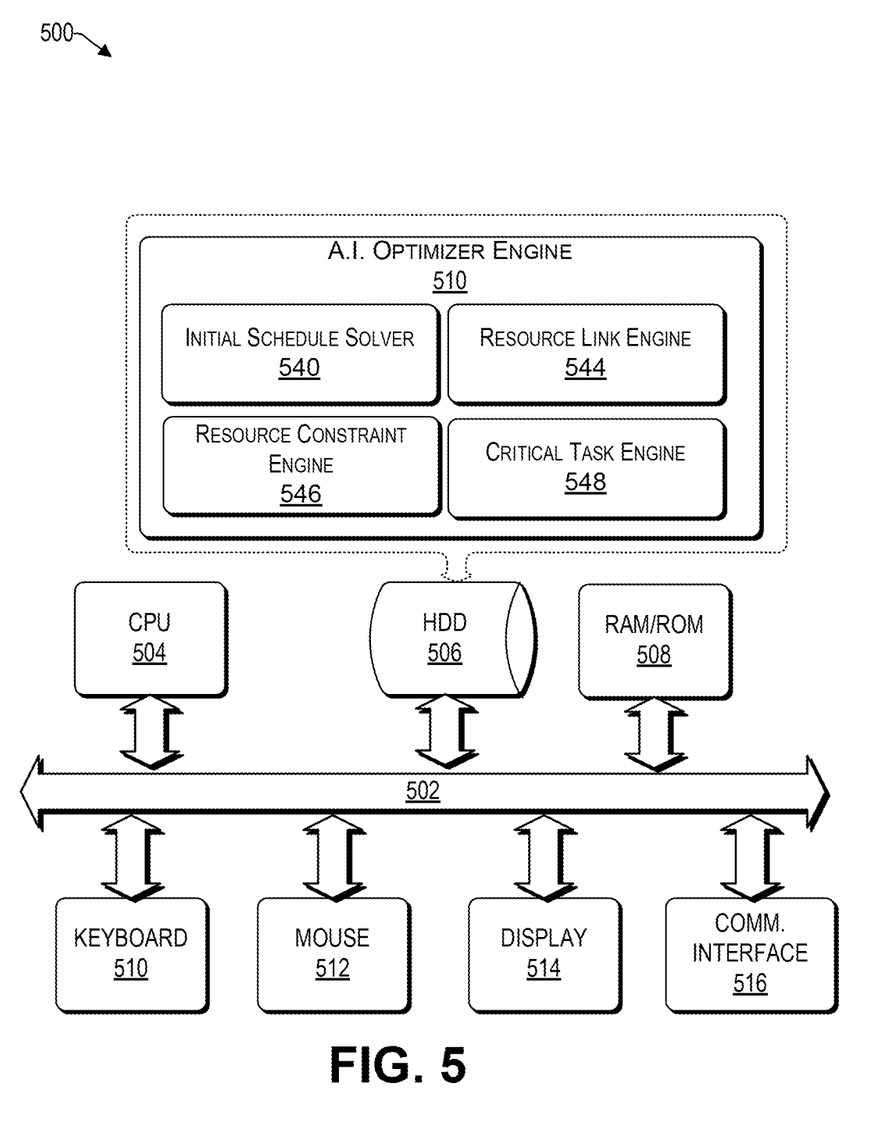
FIG. 5 is a functional block diagram illustration of a computer hardware platform that can communicate with various networked components.

As discussed above, functions relating to interpretable modeling of the subject disclosure can be performed with the use of one or more computing devices connected for data communication via wireless or wired communication, as shown in FIG. 1. FIG. 5 is a functional block diagram illustration of a computer hardware platform that can communicate with various networked components, such as a training input data source, the cloud, etc. In particular, FIG. 5 illustrates a network or host computer platform 500, as may be used to implement a server, such as the server 116 of FIG. 1.

The computer platform 500 may include a central processing unit (CPU) 504, a hard disk drive (HDD) 506, random access memory (RAM) and/or read only memory (ROM) 508, a keyboard 510, a mouse 512, a display 514, and a communication interface 516, which are connected to a system bus 502.

In one embodiment, the HDD 506, has capabilities that include storing a program that can execute various processes, such as the artificial intelligence optimizer engine 110, in a manner described herein. Generally, the artificial intelligence optimizer engine 110 may be configured to analyze a set of tasks and explain solutions of schedules optimizing the completion of the tasks under the embodiments described above. The artificial intelligence optimizer engine 110 may have various modules configured to perform different functions. In some embodiments, the artificial intelligence optimizer engine 110 may include sub-modules. For example, an initial schedule solver engine 540, a resource link generation engine 544, a resource constraint analysis engine 546, and a critical task identification and critical task path solver module 548.

Example Cloud Platform

As discussed above, functions relating to checking for access status to a restricted system, may include a cloud 120 (see FIG. 1). It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
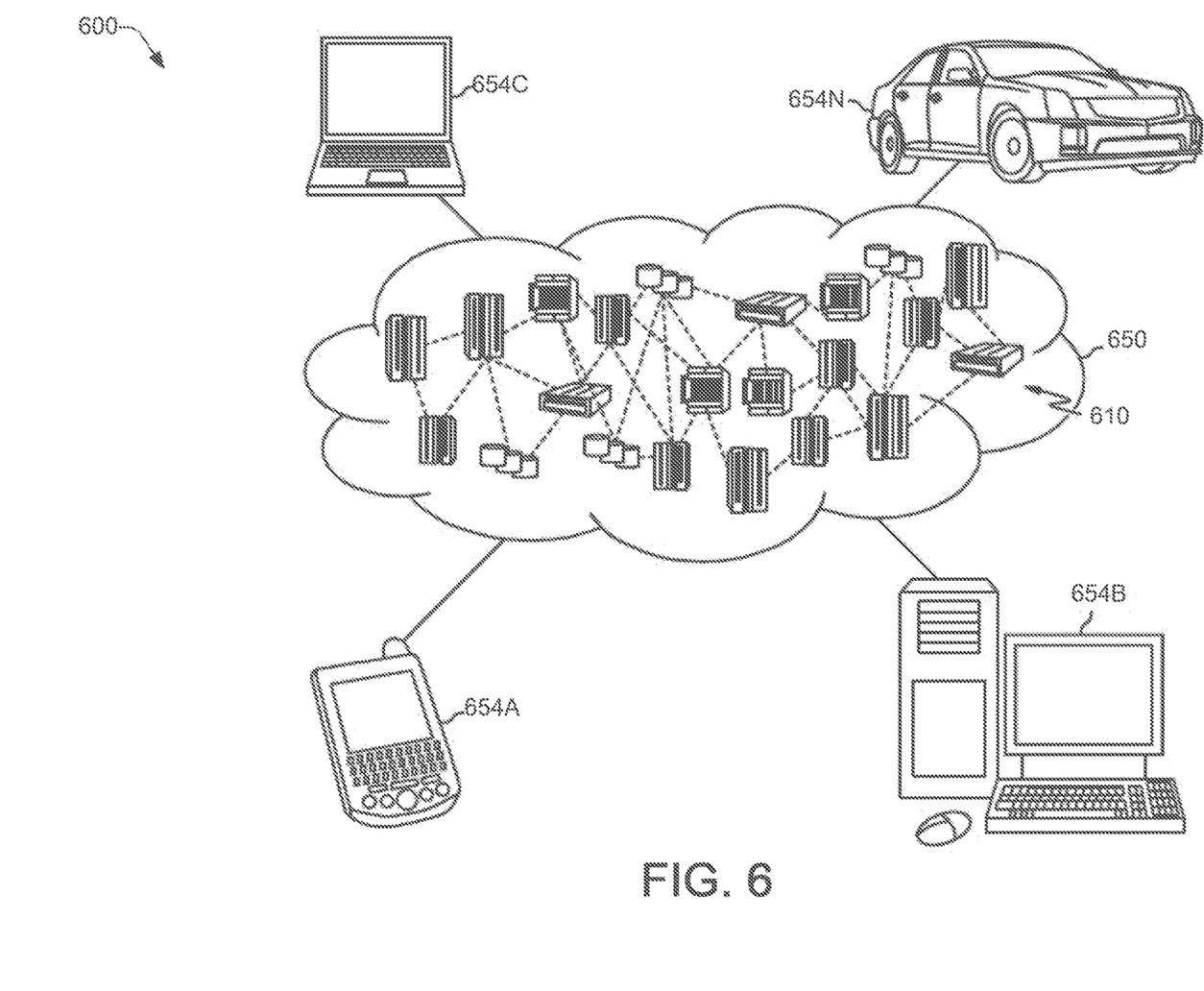
FIG. 6 depicts a cloud computing environment, consistent with an illustrative embodiment.

Referring now to FIG. 6, an illustrative cloud computing environment 600 is depicted. As shown, cloud computing environment 600 includes one or more cloud computing nodes 610 with which local computing devices used by cloud consumers, such as, for example, personal digital assistant (PDA) or cellular telephone 654A, desktop computer 654B, laptop computer 654C, and/or automobile computer system 654N may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 650 to offer infrastructure, platforms and/or software as services for which a cloud consumer does not need to maintain resources on a local computing device. It is understood that the types of computing devices 654A-N shown in FIG. 6 are intended to be illustrative only and that computing nodes 610 and cloud computing environment 650 can communicate with any type of computerized device over any type of network and/or network addressable connection (e.g., using a web browser).

Figure 7:
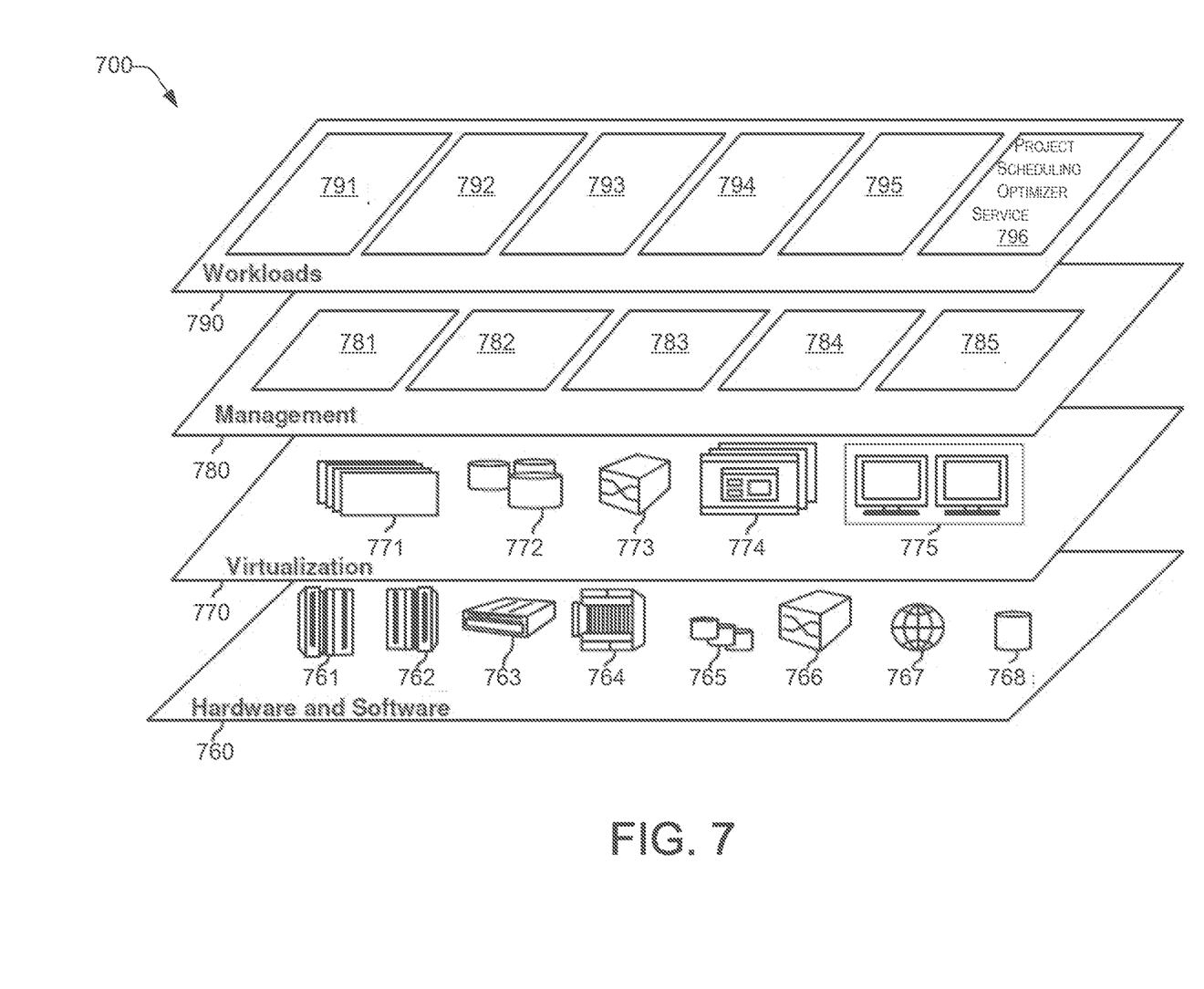
FIG. 7 depicts abstraction model layers, consistent with an illustrative embodiment.

Referring now to FIG. 7, a set of functional abstraction layers provided by cloud computing environment 650 (FIG. 6) is shown. It should be understood in advance that the components, layers, and functions shown in FIG. 7 are intended to be illustrative only and embodiments of the disclosure are not limited thereto. As depicted, the following layers and corresponding functions are provided:

Hardware and software layer 760 includes hardware and software components. Examples of hardware components include: mainframes 761; RISC (Reduced Instruction Set Computer) architecture based servers 762; servers 763; blade servers 764; storage devices 765; and networks and networking components 766. In some embodiments, software components include network application server software 767 and database software 768.

Virtualization layer 770 provides an abstraction layer from which the following examples of virtual entities may be provided: virtual servers 771; virtual storage 772; virtual networks 773, including virtual private networks; virtual applications and operating systems 774; and virtual clients 775.

In one example, management layer 780 may provide the functions described below. Resource provisioning 781 provides dynamic procurement of computing resources and other resources that are utilized to perform tasks within the cloud computing environment. Metering and Pricing 782 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 783 provides access to the cloud computing environment for consumers and system administrators. Service level management 784 provides cloud computing resource allocation and management such that required service levels are met. Service Level Agreement (SLA) planning and fulfillment 985 provide pre-arrangement for, and procurement of, cloud computing resources for which a future requirement is anticipated in accordance with an SLA.

Workloads layer 790 provides examples of functionality for which the cloud computing environment may be utilized. Examples of workloads and functions which may be provided from this layer include: mapping and navigation 791; software development and lifecycle management 792; virtual classroom education delivery 793; data analytics processing 794; transaction processing 795; and project management scheduling optimizer services 796, as discussed herein.

CONCLUSION

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to call flow illustrations and/or block diagrams of a method, apparatus (systems), and computer program products according to embodiments of the present disclosure. It will be understood that each step of the flowchart illustrations and/or block diagrams, and combinations of blocks in the call flow illustrations and/or block diagrams, can be implemented by computer readable program instructions.

These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the call flow process and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the call flow and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the call flow process and/or block diagram block or blocks.

The flowchart and block diagrams in the Figures illustrate the architecture, functionality, and operation of possible implementations of systems, methods, and computer program products according to various embodiments of the present disclosure. In this regard, each block in the call flow process or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or call flow illustration, and combinations of blocks in the block diagrams and/or call flow illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A computer implemented method to explain large scale scheduling solutions on large scale project scheduling instances, comprising:
    receiving, by an artificial intelligence (A.I.) module, an original instance of a resource constrained scheduling problem, wherein the instance includes a set of tasks, one or more resource requirements and one or more constraints;
    determining, using an optimizer engine, a schedule for the set of tasks based on (i) the one or more resource requirements and on (ii) the one or more constraints, while minimizing a makespan of the schedule;
    upon a determination that the set of tasks are constrained to a single uniform resource type:
        constructing a set of time slots of start and end times for each of the tasks;
        adding a left dummy task and a right dummy task to the left of and to the right of each time slot in the set of time slots, respectively;
        constructing a transportation problem instance, wherein:
            the left dummy task, ending before a current time slot, represents suppliers as the tasks; and
            the right dummy task, starting after the current time slot, represents demands as the tasks;
        solving the transportation problem instance to obtain sets of pairs of tasks, wherein each pair of tasks represents:
            suppliers and demands; and
            a non-zero transfer of a resource from a supplier task to a demand task;
        adding the resource link, for each pair of tasks, to a precedence graph; and
        post-processing the dummy tasks, comprising:
            for each dummy task, adding the resource links between incoming neighbor tasks and out-going neighbor tasks in the precedence graph; and
    deleting all the dummy tasks;
    generating a minimal set of resource links, wherein the resource links are based on resource dependencies between tasks in the set of tasks;
    adding the resource links to the original instance of the resource constrained scheduling problem, as precedence constraints;
    removing all the resource constraints from the original instance of the resource constrained scheduling problem;
    computing, using a constraint propagation method, a set of critical tasks in the schedule of tasks using a non-resource constrained critical path; and
    providing one or more schedules with an explanation of an optimized order of the set of tasks based on the use of the non-resource constrained critical path.

2. The method of claim 1, wherein for each time slot:
    the left dummy task is constructed with a first resource requirement equal to a residual/unused capacity before the time slot and of zero duration; and
    the right dummy task is constructed with a second resource requirement equal to the residual/unused capacity after the time slot and of zero duration.

3. The method of claim 1, wherein the variety of constraints include a resource constraint or a capacity precedence constraint or user defined constraints.

4. The method of claim 1, wherein the precedence constraints are provided as a directed acyclic graph of the set of tasks.

5. A computer implemented method to explain large scale scheduling solutions on large scale project scheduling instances, comprising:
    receiving, by an artificial intelligence (A.I.) module, an original instance of a resource constrained scheduling problem, wherein the instance includes a set of tasks, one or more resource requirements and one or more constraints;
    determining, using an optimizer engine, a schedule for the set of tasks based on (i) the one or more resource requirements and on (ii) the one or more constraints, while minimizing a makespan of the schedule;
    generating a minimal set of resource links, wherein the resource links are based on resource dependencies between tasks in the set of tasks;
    adding the resource links to the original instance of the resource constrained scheduling problem, as precedence constraints;
    removing all the resource constraints from the original instance of the resource constrained scheduling problem;
    computing, using a constraint propagation method, a set of critical tasks in the schedule of tasks using a non-resource constrained critical path;
    providing one or more schedules with an explanation of an optimized order of the set of tasks based on the use of the non-resource constrained critical path; and
    upon a determination that the set of tasks are constrained to a multiple uniform resource type:
        constructing a set of time slots of start and end times for each of the tasks;
        adding a left dummy task and a right dummy task to the left of and to the right of, each time slot in the set of time slots, respectively;
        constructing a multi-resource transportation problem instance, wherein:
            the left dummy task, ending before a current time slot, represents suppliers as the tasks; and
            the right dummy task, starting after the current time slot, represents demands as the tasks;
        solving the multi-resource transportation instance to obtain a set of triplets of tasks and resources, wherein each triplet represents:
            a supplier, a demand, and a resource; and
            a non-zero transfer of the respective resource from a supplier task to a demand task;
        adding the resource link, annotated with a corresponding resource, for each triplet, to a precedence graph; and post-processing the dummy tasks, comprising:
for each dummy task, adding the resource links between incoming neighbor tasks and out-going neighbor tasks in the precedence graph; and
deleting all the dummy tasks.

6. The method of claim 5, wherein for each time slot:
the left dummy task is constructed with a first resource requirement equal to a residual/unused capacity before the time slot and of zero duration; and
the right dummy task is constructed with a second resource requirement equal to the residual/unused capacity after the time slot and of zero duration.

7. The method of claim 5, wherein:
for multiple non-uniform resources, the method further comprises:
for each non-uniform resource:
computing a maximum capacity of the resource available over the time horizon;
constructing a set of time intervals wherein each time interval is characterized by an available uniform capacity of the non-uniform resource;
creating a zombie task, for each time interval, in the event the available uniform capacity is strictly less than the maximum capacity, the zombie task including a resource requirement equal to a difference between the maximum capacity and the available uniform capacity, and including a duration equal to a length of the time interval;
constructing a uniform multiple resource instance using, for each resource, the maximum capacity of the resource as the uniform capacity for the resource; and
solving, for the case of the multiple uniform resource type, for a set of resource links in a uniform multiple resource setting.

8. The method of claim 7, wherein the set of tasks includes interruptible tasks that can be stopped at the end of a first shift and resumed at a beginning of a next shift.

9. The method of claim 8, further comprising:
transforming a time horizon by deleting any time-windows outside the first and next shifts;
modifying the schedule to include the interruptible tasks spread across multiple shifts by combining different interruptible tasks within one the shifts as a single uninterruptible job; and
generating the set of resource links for non-interruptible tasks.

10. A computer program product to explain large scale scheduling solutions on large scale project scheduling instances, the computer program product comprising:
one or more computer readable storage media, and program instructions collectively stored on the one or more non-transitory computer readable storage media, the program instructions comprising:
receiving, by an artificial intelligence (A.I.) module, an original instance of a resource constrained scheduling problem, wherein the instance includes a set of tasks, one or more resource requirements, and one or more constraints;
upon a determination that the set of tasks are constrained to a single uniform resource type:
constructing a set of time slots of start and end times for each of the tasks;
adding a left dummy task and a right dummy task respectively, to the left of and to the right of, each time slot in the set of time slots;
constructing a transportation problem instance, wherein:
the left dummy task, ending before a current time slot, represents suppliers as the tasks, and
the right dummy task, starting after the current time slot, represents demands as the tasks;
solving the transportation problem instance to obtain sets of pairs of tasks, wherein each pair of tasks represents:
suppliers and demands; and
a non-zero transfer of a resource from a supplier task to a demand task;
adding the resource link, for each pair of tasks, to a precedence graph;
post-processing the dummy tasks, comprising:
for each dummy task, adding the resource links between incoming neighbor tasks and out-going neighbor tasks in the precedence graph; and
deleting all the dummy tasks;
determining, using an optimizer engine, a schedule for the set of tasks based on (i) the one or more resource requirements and on (ii) the one or more constraints, while minimizing a makespan of the schedule;
generating a minimal set of resource links, wherein the resource links are based on resource dependencies between tasks in the set of tasks;
adding the resource links to the original instance of the resource constrained scheduling problem, as precedence constraints;
removing all the resource constraints from the original instance of the resource constrained scheduling problem;
computing, using a constraint propagation method, a set of critical tasks in the schedule of tasks using a non-resource constrained critical path; and
providing one or more schedules with an explanation of an optimized order of the set of tasks based on the use of the non-resource constrained critical path.

11. The computer program product of claim 10, wherein for each time slot:
the left dummy task is constructed with a first resource requirement equal to a residual/unused capacity before the time slot and of zero duration; and
the right dummy task is constructed with a second resource requirement equal to the residual/unused capacity after the time slot and of zero duration.

12. The computer program product of claim 10, wherein the program instructions further comprise, upon a determination that the set of tasks are constrained to a multiple uniform resource type:
constructing a set of time slots of start and end times for each of the tasks;
adding a left dummy task and a right dummy task respectively, to the left of and to the right of, each time slot in the set of time slots;
constructing a multi-resource transportation problem instance, wherein:
the left dummy task, ending before a current time slot, represents suppliers as the tasks; and
the right dummy task, starting after the current time slot, represents demands as the tasks;
solving the multi-resource transportation instance to obtain a set of triplets of tasks and resources, wherein each triplet represents:
a supplier, a demand, and a resource; and
a non-zero transfer of the respective resource from a supplier task to a demand task;
adding the resource link, annotated with a corresponding resource, for each triplet, to a precedence graph;

post-processing the dummy tasks, comprising:
for each dummy task, adding the resource links between incoming neighbor tasks and out-going neighbor tasks in the precedence graph; and
deleting all the dummy tasks.

13. The computer program product of claim 12, wherein for each time slot:
the left dummy task is constructed with a first resource requirement equal to a residual/unused capacity before the time slot and of zero duration; and
the right dummy task is constructed with a second resource requirement equal to the residual/unused capacity after the time slot and of zero duration.

14. The computer program product of claim 12, wherein for multiple non-uniform resources, the method further comprises, for each non-uniform resource:
computing a maximum capacity of the resource available over the time horizon;
constructing a set of time intervals wherein each time interval is characterized by an available uniform capacity of the non-uniform resource;
creating a zombie task, for each time interval, in the event the available uniform capacity is strictly less than the maximum capacity, the zombie task including a resource requirement equal to a difference between the maximum capacity and the available uniform capacity, and including a duration equal to a length of the time interval;
constructing a uniform multiple resource instance using, for each resource, the maximum capacity of the resource as the uniform capacity for the resource; and
solving, for the case of the multiple uniform resource type, for a set of resource links in a uniform multiple resource setting.

15. The computer program product of claim 14, wherein the set of tasks includes interruptible tasks that can be stopped at the end of a first shift and resumed at a beginning of a next shift.

16. The computer program product of claim 15, wherein the program instructions further comprise:
transforming a time horizon by deleting any time-windows outside the first and next shifts;
modifying the schedule to include the interruptible tasks spread across multiple shifts by combining different interruptible tasks within one of the shifts as a single uninterruptible job; and
generating the set of resource links for non-interruptible tasks.

17. The computer program product of claim 10, wherein the variety of constraints include a resource constraint or a capacity precedence constraint or user defined constraints.

18. A computer device to explain large scale scheduling solutions on large scale project scheduling instances, comprising:
a network connection;
one or more computer readable storage media;
an artificial intelligence (A.I.) module stored in the computer readable storage media;
a processor coupled to the network connection and coupled to the one or more computer readable storage media; and
a computer program product comprising program instructions collectively stored on the one or more computer readable storage media, the program instructions comprising:
receiving, by the A.I. module, an original instance of a resource constrained scheduling problem, wherein the instance includes a set of tasks, one or more resource requirements, and one or more constraints;
determining, using an optimizer engine, a schedule for the set of tasks based on the one or more resource requirements and based on the one or more constraints, while minimizing a makespan of the schedule;
upon a determination that the set of tasks are constrained to a single uniform resource type:
constructing a set of time slots of start and end times for each of the tasks;
adding a left dummy task and a right dummy task to the left of and to the right of each time slot in the set of time slots, respectively;
constructing a transportation problem instance, wherein:
the left dummy task, ending before a current time slot, represents suppliers as the tasks; and
the right dummy task, starting after the current time slot, represents demands as the tasks;
solving the transportation problem instance to obtain sets of pairs of tasks, wherein each pair of tasks represents:
suppliers and demands; and
a non-zero transfer of a resource from a supplier task to a demand task;
adding the resource link, for each pair of tasks, to a precedence graph; and
post-processing the dummy tasks, comprising:
for each dummy task, adding the resource links between incoming neighbor tasks and out-going neighbor tasks in the precedence graph; and
deleting all the dummy tasks;
generating a minimal set of resource links, wherein the resource links are based on resource dependencies between tasks in the set of tasks;
adding the resource links to the original instance of the resource constrained scheduling problem, as precedence constraints;
removing all the resource constraints from the original instance of the resource constrained scheduling problem;
computing, using a constraint propagation method, a set of critical tasks in the schedule of tasks using a non-resource constrained critical path; and
providing one or more schedules with an explanation of an optimized order of the set of tasks based on the use of the non-resource constrained critical path.

* * * * *